United States Patent [19]

Thami et al.

[11] Patent Number: 5,496,936
[45] Date of Patent: Mar. 5, 1996

[54] PRODUCTION PROCESS OF QUICK SOLUBLE AGAR

[75] Inventors: Lebbar Thami; Lebbar Rachid; Riad Abdelwahab, all of Kenitra, Morocco

[73] Assignee: Societe d'Etude d'Exploition et d'Algues et Produits Maritimes Setexam, Kenitra, Morocco

[21] Appl. No.: 920,808

[22] Filed: Jul. 28, 1992

[30] Foreign Application Priority Data

Jul. 30, 1991 [MA] Morocco .................................... 22521

[51] Int. Cl.$^6$ ...................................................... C08L 5/12
[52] U.S. Cl. ........................................... 536/124; 536/128
[58] Field of Search ............................. 536/3, 114, 124, 536/128

[56] References Cited

U.S. PATENT DOCUMENTS

| | | | |
|---|---|---|---|
| 1,399,359 | 12/1921 | Matsuoka | 536/3 |
| 1,712,785 | 5/1929 | Becker | 536/3 |
| 3,901,873 | 8/1975 | Doi et al. | 536/114 |
| 4,145,454 | 3/1979 | Dea et al. | 426/565 |
| 4,307,117 | 12/1981 | Leshik | 426/96 |
| 4,565,702 | 1/1986 | Morley et al. | 426/93 |
| 4,584,128 | 4/1986 | Mookherjee et al. | 252/522 R |
| 4,601,907 | 7/1986 | Knebl et al. | 426/5 |
| 4,707,376 | 11/1987 | Muraoka et al. | 426/658 |
| 5,099,009 | 3/1992 | Thibault et al. | 536/2 |

FOREIGN PATENT DOCUMENTS

| | | |
|---|---|---|
| 1601206 | 9/1970 | France . |
| 3-195480 | 8/1991 | Japan . |

OTHER PUBLICATIONS

Derwent Abstract DW 9140, JO3195480 Granulation of Powdery Agar Aug. 1991.
Derwent Abstract DW 9140, CA 1288423 Sep. 1991.
Derwent Abstract DW 9136, DE 4005927 Modified Solid Carrier for Immobilising Proteins Aug. 1991.
Derwent Abstract DW9131 HUT 055805 Agarose Prepn. from Agar, Jun. 1991.
Derwent Abst. DW 9130 JO 3139501 Preparation of Agarose Jun. 1991.
Derwent Abs. DW 9048 RO 98657 Beadtype gel form . . . Mar. 1990.
Derwent Abs. DW 9033 WO 9007978 Electrophoretic gel systems Jul. 1990.
Derwent Abs. DW 9022 EP 370417 Multilayer diagnostic assay element May 1990.
Derwent Abs. DW9015 JO 2065788 Agar oligo saccharide prepn. Mar. 1990.
Derwent Abs. DW8908 EP 304024 Agarose purificn. Feb. 1989.
Derwent Abs. DW8907 J 64001701 Random structure agar Prep. Jan. 1989.
Derwent Abs. DW8847 SU 13 95640 Sorbent for ligand exchange . . . May 1988.
Derwent Abs. DW8841 J63214192 Prepn. of alginic acid oligosaccharide Sep. 1988.
Derwent Abs. DW8838 J63196601 Dehydration Concn. of aqsoln . . . Aug. 1988.
Derwent Abs. DW8721 J62083870 Soluble agar. prepn. Apr. 1987.
Derwent Abs. DW8720 EP 222704 Poly:galactan and nitrogen cpd. May 1987.
Derwent Abs. DW8713 CN8500479 Jelly–form Chinese medicine Jul. 1986.
Derwent Abs. DW8709 J62014769 Extracting gel material from seaweed Jan. 1987.
Derwent Abs. DW8709 J62014768 Extn. of gel material from seaweed Jan. 1987.
Derwent Abs. DW8701 J61263630 Prodn. of stable agar beads Nov. 1986.
Derwent Abs DW8635 EP–192197 Fast and specific immobilisation . . . Aug. 1986.
Derwent Abs. DW8608 SU1171463 Mfr of stable hydrazide . . . Aug. 1985.
Derwent Abs. DW8608 High Strength . . . SU 1171462 Aug. 1985.
Derwent Abs. DW86 06 SU 1168564 Prepn. of Sorbent for affinity Jul. 1985.
Derwent Abs. DW 8602 J60234549 Instant mizuyokan prepn. Nov. 1985.
Derwent Abs. DW 8536 EP 153910 crosslinking agar prods. Sep. 1985.
Derwent Abs. DW8540 U.S. Pat. No. 4,542,200 Sep. 1985.
Derwent Abs. DW 8513 U.S. Pat. No. 4,504,641 Mar. 1985.
Derwent Abs. DW8504 EP–132244 crosslinked agarose sepn. May 1985.
Derwent Abs. DW 8429 SU1054353 Prepn. of amino Gp. Nov. 1983.
Derwent Abs. DW8342 EP 91409 Carrageenan complexes Oct. 1983.
Derwent Abs. DW 8340 SU 979364 Prepn. of sorbent for chromatog Dec. 1982.
Derwent Abs. DW 8335 SU 968040 Prepn. of cepharose sorbent Oct. 1982.
Derwent Abs. DW 8306 J57208975 Agar Prodn. Dec. 1982.
Derwent Abs DW 8234 SU776245 Prepn. of base for protein Dec. 1981.
Derwent Abs. DW8222 SU854936 Extn. of agarose from aq. agar Aug. 1981.

(List continued on next page.)

*Primary Examiner*—Jeffrey Mullis
*Attorney, Agent, or Firm*—Ladas & Parry

[57] ABSTRACT

The present invention relates to a process for obtaining agar-agar that can be solubilized quickly in water at a temperature higher than its gelling temperature. It consists of using the classical agar-agar in the form of dried powder or dehydrated agar gel granules obtained after the operation of mechanical pressing or of freeze-thawing, to pass through a single-screw or twin screw extruder in mixture with water principally and other products such as the Locust Been Gum, the Guar Gum, Sugar, Peptones . . . or dispersants like the Metarine, fatty acids or organic silicones. Such process allows to produce at a reduced price, an agar-agar with properties of instantaneous dissolution in hot water at a temperature higher than its gelling temperature.

9 Claims, No Drawings

OTHER PUBLICATIONS

Derwent Abs. DW 8222 SU854935 Mfr. of gelling poly–galactan Aug. 1981.
Derwent Abs. DW 8213 US 4319975 Agarose derive for gel electro phoresis Mar. 1982.
Derwent Abs DW 8213 SU833986 Prodn. of agarose from agar May 1981.
Derwent Abs. DW 8206 SU825543 Amino–anilino methoxy–benzoquinone May 1981.
Derwent Abs. DW 8208 BR800 3625 Use of residues from prodn. of agar Feb. 1982.
Derwent Abs. DW8118 DE3038016 Agarose–based gel medium Apr. 1981.
Derwent Abs. DW 8104 EP 21230 Agent for treating infections Jan. 1981.
Derwent Abs. DW8049 J55136230 Selective adsorbent for lymphocyte Oct. 1980.
Derwent Abs. DW 7933 WO7900541 Affinity Chromatography . . . Aug. 1979.
Derwent Abs. DW 7903 SU 595378 Prodn. of microbiology Mar. 1978.
Derwent Abs. DW7819 RO 65382 Ion exchanger derived from agarose Aug. 1977.
Derwent Abs. DW 7621 US 3956273 Gelling temp. of agarose May 1976.
Derwent Abs. DW 8748 US 4707542 Removal of Pyrogens and Yeast . . . Nov. 1987.
Derwent Abs. DW 8618 US 4582875 Activation of polymer carrier hydroxyl gps Apr. 1986.
WPI Abstract 81–43966D U.S. Pat. No. 4,269,863 May 1981.
WPI Abstract 89–306339/42 JP appln. 1228444 Sep. 1989.
WPI Abstract 89–2163 01/30 JP appln. 1153067 Jun. 1989.
WPI 88–052540/08 JP Appln. 63007746 Jan. 1988.
WPI 86–073768/11 JP Appln. 61025470 Feb. 1986.
WPI 85–138880/23 JP Appln. 60075262 Apr. 1985.
WPI 83–763977/37 SU 973611 Nov. 1982.
WPI 88–201225/29 JP Appln. 63137810 Jun. 1988.
WPI 83–43735K/18 SU 938902 Jul. 1982.
WPI 83–19646K/08 SU 923503 Apr. 1982.
WPI 83–13011K/06 JP Appln. 57208975 Dec. 1982.
WPI 82–45682E/22 SU 854936 Aug. 1981.
FPAT Abs. FR 2659076 Sep. 1991.
FPAT Abs. FR 2645408 Oct. 1990.
FPAT Abs. FR 2634785 Feb. 1990.
FPAT Abs. FR 2625751 Jul. 1989.
FPAT Abs. FR 2610785 Aug. 1988.
FPAT Abs. FR 2596404 Oct. 1987.
FPAT Abs. FR 2584576 Jan. 1987.
FPAT Abs. FR 2584410 Jan. 1987.
FPAT Abs FR 2518570 Jun. 1983.
FPAT Abs. FR 2492660 Apr. 1982.
FPAT Abs. FR 2489693 Mar. 1982.
FPAT Abs. FR 2458071 Dec. 1980.
FPAT Abs FR 2441660 Jun. 1980.
FPAT Abs FR 2438245 Apr. 1980.
FPAT Abs FR 2436791 Apr. 1980.
FPAT Abs. U.S. Pat. No. 4,914,024 Apr. 1990.
I.C.M. Dea J. Mol. Bio. vol. 68 pp. 153–172 1972.
L. Guidoni et al. Gazzetta Chimica Intaliano 106:473–476, 1976.
G. Pappas et al. Journal of Food Science vol. 52 No. 2, 1987 pp. 467–471.
A. Hayashi et al. Polymer Journal 10(5):485–494 (1987).
A. Hayashi, Polymer Journal 9(2):219–225 (1977).
A. Hayashi et al., Polymer Journal 12(7):447–453 (1980).
Rees et al. Polysaccharides ("Shapes and interaction of carbohydrate chains") Academic Press 1982 vol. 1, pp. 198–281.
Nishinari, K. et al. Carbohydrate Polymers 3 (1983) 39–52.
Merck Index 11th Edition p. 4484, 1989.

PRODUCTION PROCESS OF QUICK SOLUBLE AGAR

FIELD OF THE INVENTION

The present invention is related to a process of obtaining a quick soluble agar-agar. It aims particularly to allow manufacturing of an agar-agar that has the property of being dissolved quickly in hot water at a temperature higher or equal to its gelation point (30° to 45° C. according to agar-agar origin processed by this method).

BACKGROUND OF THE INVENTION

Agar-agar is a mixture of Polysaccharides (agarose+ agaropectine) of a high molecular weight between 40.000 and 200.000. Its chemical structure is a disaccharide composed of β, D, galactopyranose (1→3) linked to (3–6) anhydro, ∝-L galactopyranose (1→4). It can be also functionalized by sulphate grouping, metoxyl and pyruvat. The position and the proportion of these groupings vary according to the red seaweed used for the extraction (Gelidium, Gracilaria, Pterocladia etc. . .)

The main property of agar-agar is dissolution in hot water at reflux or in autoclave under pressure after several minutes of boiling. While cooling, this solution transforms to gel and liquifies if it is heated again.

This thermoreversible gel is characterized by a high hysteresis. The gelation temperature is 36° C.+4° C. or 40°±4° C. respectively for agar-agar extracted from Gelidium or Gracilaria. The melting temperature is 85° C.±5.

Agar-agar is obtained by extraction in water from red seaweed species like Gelidium, Gracilaria Pterocladia, Anfheltia, etc. The extraction consists in boiling in autoclaves under pressure or in open tank. The obtained extraction liquor contains about 2% agar-agar. It is filtered then gelated. The obtained gel is thus dehydrated either by mechanical pressing through filtering cloth, or by freeze-thawing at minus 20° C. that precipitates agar. These two treatments allow to obtain gels of agar-agar with moisture contents of 60 to 90%, that we call dehydrated agar-agar gel (I) in the text that follows. They are dried and grinded in order to obtain an agar-agar powder with a moisture of less than 18% that we call classical agar-agar (II) in the text that follows.

A person of skill in the art knows that the agar-agar produced by these two procedures independent of seaweed species dealt with, has characteristics of dissolving that require boiling the agar powder in water for a dozen minutes to get a complete dissolution and a good gel strength. This property makes difficult the use of the agar-agar obtained by these 2 procedures in the applications it is designed for as a gelling, thickening and texturing agent.

Many methods were described to solve this problem of dissolution. U.S. Pat. No. 3.119.697 dated Jan. 28, 1964 describes a treatment that consists in heating a concentrated agar-agar solution of 5 to 8% to which is added a quantity of crystallization controlling agent such as carbohydrate, polyol or a known dispersant. This solution is gelated, then dried in hot air. The obtained product dissolves in water at 60° C. but since it is a mixture of products, it can be used only in restricted and focused food applications.

G. Pappes' paper (Journal of Food Sciences 52 (2), 467–470, 1987) describes a procedure that consists in drying directly in a rotary vaccuum drier agar-agar solutions of 1 to 3% concentration and in recovery of the dried film and grinding it. This procedure allows obtaining an agar-agar with complete dissolution properties at 55° C., but induces high productions costs. The same principle is asserted by the Japanese patent No. 61025470 dated Apr. 2, 1986. Other patents present other treatment possibilities as described by European patent No. 0122289 dated Oct. 12, 1993 consisting of a treatment of agar-agar powder with non-equilibrium plasma. Japanese patent No. 1153067 dated Jun. 15, 1989 consists in treating by quick freezing an agar-agar gel.

SUMMARY OF THE INVENTION

This invention describes a new procedure for the obtention of agaragar that has quick dissolution properties in water at temperatures higher than its gelation temperature (36°±4° C. for the agar extracted from Gelidium, 40± for agar extracted from Gracilaria). An object of the invention is to reduce the production costs in relation to the production costs of the previously existing procedures described and known by those of skill in the art. Another object is to insert this new procedure in an agar-agar conventional production process line or to use this procedure independently by using as raw material the classical agar agar powder (II).

Another object is to produce a quick soluble agar-agar of a similar chemical composition to that of classical agar-agar (II).

This procedure could treat as well some product mixtures as a basic raw material since the final product has quick dissolution properties.

In accordance with the above objects of the invention, a quick soluble agar-agar obtention procedure conformable to the invention consists in treating classical agar-agar powder (II) or granules of dehydrated agar gel (I), by mixing principally with water and with other products if needed, by passing it through a mono-screw or twin-screw extruder. The screw configuration, its speed and its programmed temperature are explained as examples in the description of the examples which follow. This treatment by extrusion can optionally be followed by drying under flux of hot or cold air.

Experiments show that such a procedure supplies an agar-agar with quick solubilization properties in water at temperatures higher than its gelation point.

DETAILED DESCRIPTION

A person of skill in the art knows that the actual processing methods of agar-agar production include a stage where agar-agar extraction liquor is cooled and gelated. During this cooling stage, molecules get a double helix conformation forming a tridimentional network including water. The prior art production stages do not alter this order. Thus, the classical agar-agar needs energy by heating until boiling for about 10 minutes so as to dissolve completely.

During the extrusion operation, the mechanical shear applied by the extruder screw supplies the necessary energy for modifying the molecular conformation of the classical agar-agar (II) in spite of the large proportion of the introduced dry matter. This takes place even with a small quantity of water from 10% in relation to the total quantity of introduced agar-agar.

It is remarkable that the extrusion of classical agar-agar powder (II) in spite of the large proportion of dry matter, allows the obtention of an agar-agar that solubilizes quickly in hot water. The unexpected characteristic of this phenomenon is enhanced by the fact that it takes place without notable degradation of the product that keeps all its gelating properties. This phenomenon is also obtained even if we use classical agar-agar powder (II) or dehydrated agar gel granules (I) obtained from the mechanical pressing step, or the freeze-thawing stage. This is even noted for the classical agar (II) mixtures with other ingredients such as sugar, locust bean, guar gum or peptons in proportions from 0 to 50% by weight on a dry basis. This phenomenon of solubilization is still improved by the addition in relative proportions from 0 to 10% of dispersant products, such as lecithine or its derivative metarine (produced by lucas meyer, Germany), fatty acids such as glycerol monostearate, and organic silicones such as trichlorosilanes acetyl.

A general descriptive of experiments and some examples of the invention's application are illustrated below Classical agar-agar (II) in the form of dried powder with a moisture content of less than 20% or granules of dehydrated agar gel (I) having a moisture content of between 50 and 80%, are introduced in the extruder with a volumetric feeder system. A scaling pump introduces water right after powder. A gradient of temperature is programmed for the different zones of the extruder barrel for values between 20° and 170° C.

The speed of the screw is selected to obtain the needed flux for the extruded product.

The screw configuration of the twin-screw extruder may vary according to the power of the mechanical shear we want to apply. We have noted that a minimal configuration similar to a no-ending screw, allows modifying the dissolution properties of agar-agar. This explains that the single-screw extruder presents in this case the same advantages as the twin-screw one. The product is then extruded and gets through a selected die then cut with a rotary knife. This product can then optionally undergo a drying stage with cold or hot air. If the product is dried, it is dried until it contains a moisture content of between about 8 to 22% by weight. It is then pulverized to be presented in powder form. The analyses done before and after extrusion are:

Measure of the gel strength by the NIKAN method (applied on stored gels during 12 h at 20° C., prepared from 500 ml of a solution of 1.5% of agar-agar dissolved by heating under reflux during 10 mn).

Moisture determination.

EXAMPLE 1

A twin-screw extruder is used with a screw diameter of 50 mm, a barrel length of 750 mm, and the screw configuration is composed of 4 Feed screw 2", 2 short Pitch 2", 4 Feed-Screw 2", 1 Feed-Screw 3", 2 Single Lead 2", 1 Feed-Screw 3".

The speed of the screw is 400 rpm

Agar agar powder extracted from gelidium is fed in at 100 kg/h. The water flux is 40 kg/h. The initial gel strength of this agar is 850 g/cm$^2$ and has a moisture content of 16%.

The die is constituted of 3 holes of 6 mm, the temperature of the die plate is 120° C., the pressure 60 bars, and the moisture content 31%. After drying in open air area during 10 mn, the moisture content of the obtained granules is 15%.

The obtained Agar-Agar powder after pulverization dissolves in less than one minute at 80° C. and less than 2 minutes under agitation at 40° C. Its gel strength is 700 g/cm$^2$.

EXAMPLE 2

The same apparatus described in example 1 is used. The granules of dehydrated agar-agar gel (I) extracted from gelidium of 60% moisture content obtained after a stage of mechanical pressing are introduced at 200 kg/hr. No water is added. The temperature at the die plate is 120°, the pressure is 38 bars and the moisture content is 50%. The cut product is dried during 15 min under hot air at 80° C. The powder of the extruded agar-agar is soluble instantaneously at 70° C. and in less than two minutes under agitation at 40° C. Its gel strength is 700g/cm$^2$ and its moisture content is 14%.

EXAMPLE 3

The same apparatus described in example 1 is used. Agar-Agar powder extracted from Gracilaria is introduced at 90 kg/hr, its gel strength is 900 g/cm2 and its moisture content is 18%. The water flux is 45 l/h, the temperature at the die plate is 118° C., the pressure is 52 bars and the moisture content is 32%. The extruded product is stocked in room temperature during 24 h, its moisture decreases to 22%. After pulverizing, it dissolves instantaneously at 80° C. and less than two minutes under agitation at 50° C. Its gel strength is 800 g/cm2 and its moisture content is 19%.

EXAMPLE 4

The single-screw extruder has a screw diameter of 90 mm and a barrel length of 620 mm. The screw configuration is composed of 1 single flight screw and of 5 double-flight screws. The speed of the screw is 300 rpm. The die is composed of 4 mm diameter holes. The feed of agar-agar powder (II) extracted from gelidium is 130 kg/h. Its gel strength is 850 g/cm$^2$, and its moisture content is 13%. Water is introduced at a flux of 35 l/h. The temperature at the die plate is 125° C. and the pressure is 65 bars. The product is cut and dried during 15 min under a flux of hot air at 90° C., then pulverized. The obtained powder solubilises rapidly at 90° C. and at 45° C. under weak agitation. Its gel strength is 730 g/cm$^2$, its moisture content is 9%.

EXAMPLE 5

The same apparatus described in example 1 is used: The agar-agar powder (II) is mixed dry beforehand with the locust bean gum in a ratio of 9 to 1. The gel strength of this mixture is 900 g/cm$^2$, its moisture is 15% The feed of this mixture is 80 kg/h, the quantity of the injected water is 25 L/h. The temperature at the die plate is 150° C., the pressure is 71 bars. The product is stocked at room temperature during 4 h then pulverized, its humidity is 14% and its gel strength is 750 g/h. The obtained powder solubilises instantaneously at 80° C. and under weak agitation at 45° C.

EXAMPLE 6

The same apparatus described in example 1 is used. The agar-agar powder (II) extracted from gelidium is mixed dry beforehand with iced-sugar in proportions of 7 to 3. The mixture has 10% moisture and a gel strength of 750g/cm$^2$. It is introduced with a flux of 100 kg/h. The flux of water is 40 l/h. The temperature at the die plate is 118° C. the pressure 35 bars, and moisture content is 35%. The product is dried under a flux of cold open air 25° C. during 15 mn. The final moisture content is 8%. The pulverized product dissolves instantaneously at 80° C. and under strong agitation at 38° C.

EXAMPLE 7

The same apparatus described in example 1 is used. Agar-agar powder (II) extracted from Gelidium with a gel strength of 600 g/cm$^2$ and a moisture content of 10% is introduced at 100 kg/h. Water containing a suspension of 4% of metarine is introduced at a flux of 25 l/h. The temperature at the die plate is of 126° C., The pressure is 47 bars, and moisture content is 27%. The product is stocked at room temperature during 12h, then pulverized. Its moisture content is 13% and its gel strength is 510 g/cm$^2$. This product dissolves instantaneously at 80° C. rather than at 38° C.

EXAMPLE 8

The twin-screw extruder with screw diameter of 50 mm and with barrel length of 750 mm has a screw configuration composed of:

5 feed screw 2", 7°×30° forward paddle, 2 feed screw 2", 7°×60° Forward paddle, 1 single lead 2", 7°×60°Forward paddle, 1 single lead 2".

The speed of the screw is 300 rpm

Agar-agar powder (II) extracted from gelidium is fed in at 80 kg/hr; Water is added at 25 l/h. The gel strength is 750g/cm$^2$ and the moisture content is 12%.

The die is constituted of 2 holes of 8 mm. The temperature at the die plate is 170° C. the pressure is 80 bars and the moisture content is 17%.

The obtained agar-agar powder after pulverization dissolves in less than a minute at 70° C. and in less than two minutes under agitation at 50° C. The gel strength is 400 g/cm$^2$ and its moisture content is 17%.

We claim:

1. In method for processing agar-agar, agar agar is extracted from seaweed in an extraction step and then dehydrated in a dehydrating step to form an agar-agar gel or powder having molecules which exhibit a double helical molecular configuration, said gel or powder having a certain solubility in water, the improvement comprising, after the dehydrating step, extruding the gel or powder in a single or twin screw extruder having a die plate, with a sufficient shearing force so that the die plate is kept at a temperature between 118° C. and 170° C. thereby improving the solubility of the gel or the powder so the gel or powder solubilizes in water at 50° C. under agitation in less than two minutes.

2. A method as claimed in claim 1, wherein the agaragar is dehydrated in the dehydrating step by freeze-thawing.

3. A method as claimed in claim 1, wherein the agaragar is dehydrated in the dehydrating step by mechanical pressing.

4. A method as claimed in claim 1, wherein the method further comprises mixing the gel or powder with water during the extruding step and drying the extruded powder or gel.

5. A method according to claim 1 wherein the agar-agar composition comprises agar-agar and an additive selected from the group consisting of locust bean gum, guar gum, sugar and a peptone in proportions from 0 to 5% by weight.

6. A method of treating an agar-agar composition that has been extracted from seaweed and dehydrated to form an agar-agar gel or powder, said powder containing a moisture content of less than 20% said method comprising extruding the extracted and dehydrated gel or powder in a single or twin screw extruder having a die plate, at sufficient shear so that the die plate is kept at a temperature between 118° C. and 170° C. and after the gel or powder has been extruded, said gel or powder dissolves in water at 50° C. under agitation in less than two minutes.

7. A method according to claim 6, further comprising mixing the agar-agar gel or powder before extrusion with an additive selected from the group consisting of locust bean, gum-guar, sugar and a peptone in relative proportions from 0 to 50% by weight.

8. A method according to claim 7 further comprising drying the extruded gel or powder either under cold or hot air until a moisture content between 8%–22% by weight is obtained.

9. A method according to claim 6 further comprising drying the extruded product either under cold or hot air until a moisture content between 8%–22% by weight is obtained.

* * * * *